United States Patent
Tedesco et al.

(10) Patent No.: US 8,335,723 B2
(45) Date of Patent: Dec. 18, 2012

(54) APPARATUS, SYSTEMS AND METHODS FOR FACILITATING COMMERCE

(75) Inventors: Daniel E. Tedesco, Huntington, CT (US); Jay S. Walker, Ridgefield, CT (US); James A. Jorasch, New York, NY (US); Evan I. Schwartz, Ridgefield, CT (US); Dean P. Alderucci, Westport, CT (US)

(73) Assignee: Walker Digital, LLC, Stamford, CT (US)

( * ) Notice: Subject to any disclaimer, the term of this patent is extended or adjusted under 35 U.S.C. 154(b) by 1133 days.

(21) Appl. No.: 11/570,616

(22) PCT Filed: Aug. 9, 2006

(86) PCT No.: PCT/US2006/030839

§ 371 (c)(1),
(2), (4) Date: Dec. 14, 2006

(87) PCT Pub. No.: WO2007/021667

PCT Pub. Date: Feb. 22, 2007

(65) Prior Publication Data

US 2009/0012878 A1     Jan. 8, 2009

Related U.S. Application Data

(60) Provisional application No. 60/706,583, filed on Aug. 9, 2005.

(51) Int. Cl.
*G06Q 30/00* (2012.01)
(52) U.S. Cl. .................... 705/26.1; 705/27.1
(58) Field of Classification Search ............ 705/26, 705/27, 26.1–27.2
See application file for complete search history.

(56) References Cited

U.S. PATENT DOCUMENTS

| | | | |
|---|---|---|---|
| 5,862,223 A | 1/1999 | Walker et al. | |
| 5,884,272 A | 3/1999 | Walker et al. | |
| 6,529,602 B1 | 3/2003 | Walker et al. | |
| 7,519,836 B2 | 4/2009 | Walker et al. | |
| 7,526,439 B2* | 4/2009 | Freishtat et al. | 705/26 |
| 2002/0128923 A1* | 9/2002 | Dale | 705/26 |
| 2003/0154099 A1* | 8/2003 | Tuijn et al. | 705/1 |
| 2004/0030601 A1* | 2/2004 | Pond et al. | 705/16 |
| 2005/0063540 A1* | 3/2005 | Hsiung | 380/217 |
| 2005/0198095 A1* | 9/2005 | Du et al. | 709/200 |
| 2009/0287532 A1* | 11/2009 | Cohen et al. | 705/9 |

OTHER PUBLICATIONS

"Coming Soon: To a cell phone or PDR near you" Jenn Shreve. Photo District News. (Eastern Ed.). New York: Aug. 2001. vol. 21, Iss. 8; p. P30. Retrieved via ProQuest.*
U.S. Appl. No. 60/450,459 titled "System and Method for the Remote Monitoring of Critical Civilian Infrastructure" filed Feb. 26, 2003, 146 pp.
International Preliminary Examination Report with Written Opinion for PCT/US2006/030839 mailed Feb. 12, 2008, 4 pp.
International Search Report for PCT/US06/30839 mailed May 1, 2007, 1 pg.

* cited by examiner

*Primary Examiner* — Michael Misiaszek
(74) *Attorney, Agent, or Firm* — Michael D. Downs; Fincham Downs, LLC

(57) ABSTRACT

According to one or more embodiments, apparatus, systems and methods are provided for facilitating commerce. In some embodiments, an apparatus (e.g., a central computer) facilitates posting of an item for sale by receiving a digital image of an item for sale, receiving an audio description (e.g., included in an audio file) of the item, and providing an indication of the description to at least one potential buyer. In one embodiment, the digital image and the audio description are received from a mobile phone.

33 Claims, 4 Drawing Sheets

APPARATUS, SYSTEMS AND METHODS FOR FACILITATING COMMERCE

The present application claims the benefit of priority of PCT/US06/30839, filed Aug. 9, 2006, entitled "APPARATUS, SYSTEMS AND METHODS FOR FACILITATING COMMERCE," which claims the benefit of priority of U.S. Provisional Patent Application No. 60/706,583, filed Aug. 9, 2005, entitled "APPARATUS, SYSTEMS AND METHODS FOR FACILITATING COMMERCE," which is incorporated by reference herein in its entirety.

BACKGROUND INFORMATION

Many people (e.g., consumers) have used items they no longer want, including such items as clothes, children's toys, tools and the like. It is hard for people to liquidate unwanted, used items. Certain items, especially those valued at less than $100, are particularly hard to liquidate. There are several methods by which people attempt to liquidate unwanted, used items. However, each method suffers from various drawbacks.

Some people who wish to sell unwanted, used items place flyers on bulletin boards. However, there is significant time and expense in printing flyers and traveling to each location where a flyer is to be posted. Once posted, there is no way of knowing whether or not the flyer has been torn down, damaged by weather, or the like. Moreover, even if a prospective buyer calls the seller, both sides must deal with the anxiety of meeting a stranger before the prospective buyer can meaningfully observe the subject item. That is, the buyer is limited to whatever pictures the seller has included in the flyer.

Print classifieds in local newspapers present another option. However, it is expensive to place a classified ad, making it cost prohibitive to list low-value items for sale. It also takes a significant amount of time to list a used item for sale in the classifieds. Moreover, space is extremely limited for sellers to advertise items, so textual descriptions must be so concise that they are not very informative. And, space limitations make printing pictures of items impractical. Even if a seller chooses to place a classified ad, the ad is not made available to prospective buyers right away. Rather, the publisher must first print and distribute the paper to readers. Prospective buyers must inefficiently read through irrelevant listings in the hopes of coming across an item of interest. There is no way to quickly search print classifieds. Here too, counterparties must deal with the anxiety of meeting a stranger before the buyer really understands the nature and condition of the subject item. After sellers sell an item, they may still receive phone calls from prospective buyers. Short of pestering sellers, buyers have no way of knowing whether or not an item has been sold.

Other options are available on the Internet. Various online classified services are available, such as www.craigslist.com. However, local distribution is not guaranteed, and is only made possible by word-of-mouth or "viral", organic marketing. Such online services require users to own computers, have Internet connections, and be computer literate. Further, such online services typically require users to maintain email accounts. As with print classifieds, listings do not provide much detail about the listed items. Further, listings almost never provide adequate information about the counterparty (e.g., creditworthiness, track record, etc.).

Online auctions, such as eBay, are popular, but suffer from many shortcomings. Such online services require users to own computers, have Internet connections, and be computer literate. Further, such online services typically require users to maintain email accounts. Posting items for sale or up for auction is burdensome and time consuming. Sellers must establish accounts, access accounts, transfer pictures from a digital camera to a personal computer, upload the pictures to the auction service, and take the time to type up a description of the item. Online services charge sellers to post items and may charge a percentage of the final sale price. It is hard for buyers to ask sellers questions about posted items because buyers are limited to submitting questions through email or similar asymmetrical, text-based communications tools. Thus, if a buyer has detailed questions, or simply a high volume of questions, the buyer is less likely to type up the questions, and the seller is less likely to respond to such questions. However, online auction services deter "offline" (e.g., telephonic) communications between buyers and sellers, as it may circumvent their central role, an opportunity to earn revenue from consummated transactions.

Security is a major concern with online auction services, such as eBay. Given the lack of ability to ask questions of sellers, buyers have a tough time determining the condition and authenticity of the posted goods. Counterfeits are common. Sellers can set up multiple accounts, allowing fraud to go undetected. Through one account, a seller may "shill" an auction for an item posted through another account. Shilling is where a seller submits a bid to one of his own auctions in an effort to artificially drive the price of an auction up, or to outbid a final bid that is less than the seller expected or hoped for. Because online auction services such as eBay do not adjudicate disputes between buyers and sellers, a disgruntled party's recourse is limited to submitting a poor "rating" of the counterparty. Aside from the fact that this does not prevent fraud at the outset, it is easily overcome by a bad actor, who may easily set up a new account with a "clean slate."

Geographical distance between remote parties makes simultaneous exchange of payment for goods impossible. This leads to many problems, such as where a buyer pays before receiving simultaneity of exchange/confirmation of exchange. It also prevents buyers from paying in cash.

If a buyer and seller reach an agreement, there are significant costs and burdens associated with packing, shipping and payment processing.

Some people have "yard sales" or "garage sales". However, yard sales are onerous and time consuming. It takes time to physically price and tag each item, advertise the sale, and move the items to the front lawn or the garage. Then, the seller must spend the day administrating the event, watching for theft and haggling with a variable of strangers who come to the seller's house. Only those people who own or rent houses can practically or easily have yard sales. The times when one can host a yard sale are limited. Often one can only have a yard sale on weekends, weather permitting. Given the limited (e.g., 1 day) duration of a yard sale, there is a naturally downward price pressure imposed on the seller, who may feel pressured to sell items at less than their fair market value, in an effort to reduce clutter. Knowing this, buyers may pester sellers with lowball offers.

In all of these systems for selling unwanted, used items, both buyers and sellers must take the time and energy to learn about a particular market or item, in order to determine a fair market value. Uneducated sellers may not know the true value, resulting in a lost opportunity. Conversely, uneducated buyers may overpay. Thus, the requisite time and energy to learn a particular market is typically only spent for higher value items (e.g., items over $100).

When the above methods fail to provide the seller with liquidity, donation may be a last resort, although many sellers do not donate the unsold items. Many items are not appropriate for donation. Some sellers are in need of cash, and cannot afford to part with potentially valuable items without receiving cash in exchange. It is difficult to find a suitable or willing donee for many types of items. Although tax deductions are available, they are sharply limited and of more value to high income individuals than to lower income individuals who would benefit more from liquidation of the underlying asset.

As a result, there remain in closets and garages everywhere items that people would love to turn into cash, if it were quick, easy and safe to do so. In a manner of speaking, only the tip of the iceberg makes it online or in the classifieds, leaving the vast majority of used goods underneath the surface, and off the market.

Mobile telephones such as cellular telephones are widely used. Most cell phones have cameras and speakerphone capability. It is estimated that 280 million camera phones will be sold in 2005. Retaining cell phone accounts is an extremely difficult and expensive problem for cell companies. Customers have little loyalty and very little incentive to stay with their current carrier. According to a 2004 study by the University of Michigan, mobile phone service was the second-lowest ranked industry for customer satisfaction. Despite statutorily mandated phone number portability, customers are effectively prevented from switching service providers as they are bound by the penalty provisions of service contracts, which customers readily or unknowingly accept in order to receive deeply discounted or free cell phones. Thus, in many cases, penalties are basically the only thing that keeps the customer from switching service providers.

DETAILED DESCRIPTION

Figure 1A:
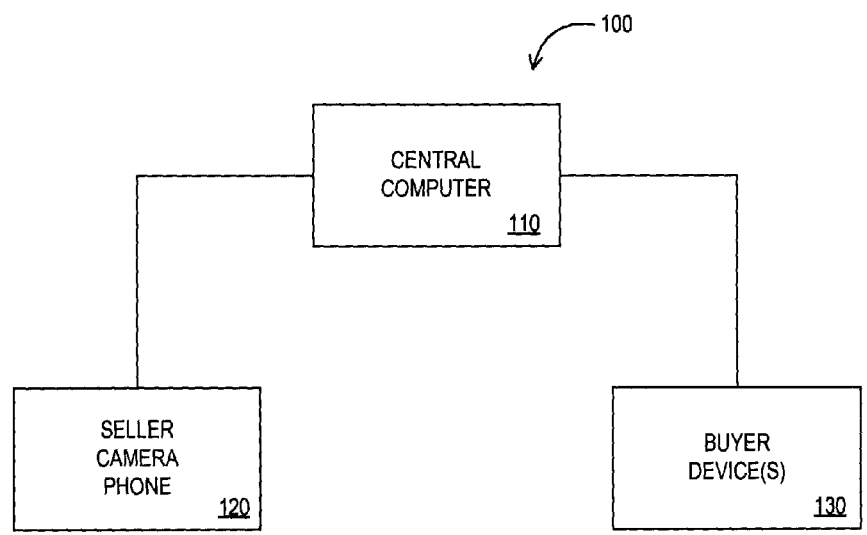
FIG. 1A depicts an example system in accordance with one or more embodiments of the present invention.

This disclosure describes apparatus, systems and methods for using various types of devices (e.g., mobile or cellular telephones) to sell and to buy personal property. In one embodiment, a system facilitates (e.g., via a central computer) a person-to-person marketplace for goods (e.g., clothing, toys, tools, appliances, etc.) in which a person can use a camera-enabled communication device (e.g., a cell phone) to rapidly create and display an advertisement by (1) taking a picture of an item he or she wishes to sell and (2) transmitting the picture to a central sales administrator that helps to fashion an advertisement based on the picture. Many other embodiments are described in this disclosure.

Rules of Interpretation

In the following description, reference is made to the accompanying drawings that form a part hereof, and in which is shown, by way of illustration, specific embodiments in which the invention may be practiced. These embodiments are described in sufficient detail to enable those skilled in the art to practice the invention, and it is to be understood that other embodiments may be utilized and that structural, logical, software, and electrical changes may be made without departing from the scope of the present invention. The following description is, therefore, not to be taken in a limiting sense Numerous embodiments are described in this patent application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with various modifications and alterations. Although particular features of the present invention may be described with reference to one or more particular embodiments, figures or examples, it should be understood that such features are not limited to usage in the one or more particular embodiments or figures with reference to which they are described.

The enumerated listing of items does not imply that any or all of the items are mutually exclusive, unless expressly specified otherwise.

A description of an embodiment with several components (e.g., cell phones) in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

It will be readily apparent that the various methods and algorithms described herein may be implemented by, e.g., appropriately programmed general purpose computers and computing devices, including but not limited to cellular telephones, personal computers, telephone company computers. Typically a processor (e.g., a microprocessor) will receive instructions from a memory or like device, and execute those instructions, thereby performing a process defined by those instructions, including the inventive processes described herein. Further, programs that implement such methods and algorithms may be stored and transmitted using a variety of known media.

When a single device or article is described herein, it will be readily apparent that more than one device/article (whether or not they cooperate) may be used in place of a single device/article. For example, where a cell phone is described as having GPS capability, a separate and independent GPS unit may communicate with a cell phone to provide such functionality. Similarly, where more than one device or article is described herein (whether or not they cooperate), it will be readily apparent that a single device/article may be used in place of the more than one device or article. For example, a cell phone may comprise a GPS unit.

The functionality and/or the features of a device may be alternatively embodied by one or more other devices which are not explicitly described as having such functionality/features. Thus, other embodiments of the present invention need not include the device itself.

Where databases are described, it will be understood by one of ordinary skill in the art that (1) alternative database structures to those described may be readily employed, and (2) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

The terms "a", "an" and "the" mean "one or more", unless expressly specified otherwise.

The term "computer-readable medium" as used herein refers to any medium that participates in providing data (e.g., instructions) that may be read by a computer, a processor or a like device.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising" and variations thereof mean "including but not limited to", unless expressly specified otherwise.

The terms "call notification data", "call notification content", "notification data", "notification content" and the like refer to data, sounds (e.g., ring tones), messages and the like which are output to a user of a device upon the receipt by the device of an inbound communication signal, such as a telephone call.

The terms "service provider", "telephone service provider", "cellular telephone service provider", "cellular service", "central service", and "network provider" refer to an operator of a central computer system.

Example Apparatus, Systems and Products

In one or more embodiments, one or more devices are employed to perform one or more steps of one or more inventive methods. A device (e.g., a central computer, a personal computer, a cell phone) may be operable to communicate with (e.g., transfer data to and receive data from) any other device (e.g., a central computer, a personal computer, a cell phone). Devices may be configured with one or more of the features described in this disclosure.

In one or more embodiments, a device may employ one or more processors, such as a Pentium® or Centrino® grade processor manufactured by Intel Corporation. Processors may receive software instructions from a computer readable medium and execute commands so as to perform one or more methods (or steps thereof) of the present invention.

Computer readable media include any media that participate in providing data that may be read by a computer, a processor or a like device. Computer-readable media may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, Subscriber Identity Module (SIM) cards, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (1) may be delivered from RAM to a processor, (2) may be carried over a wireless transmission medium (e.g., cellular telephone signal), and/or (3) may be formatted according to numerous formats, standards or protocols, such as Bluetooth®, TDMA, CDMA, 3G.

In one or more embodiments, a device may include an Application-Specific Integrated Circuit (ASIC) that is configured to perform one or more methods of the present invention.

Any combination of hardware, firmware and software, as known in the art, may be employed to perform the inventive processes disclosed herein.

A device may have one or more power sources, including but not limited to a rechargeable battery unit comprised in whole or part with lithium, nickel-cadmium and/or nickel-metal hydride battery. Of course, other power sources may be employed, as would be apparent to one of ordinary skill in the art.

One or more input devices may be included as part of a device. Such input devices may receive commands or data from a user and transmit the same to (1) a processing apparatus of the device (e.g., a microprocessor) and/or (2) another device (e.g., a central computer, another cellular phone, etc.). Input devices that may be part of a device include but are not limited to one or more of the following:

A keypad, such as a common alphanumeric numeric telephone keypad, may be included as part of a device. In one or more embodiments, a keypad may be configured to produce, emit or otherwise permit the transmission of dual tone, multi-frequency (DTMF) tones. As is known in the art, DTMF tones are commands initiated by a user of a telephone by depressing keys of a keypad. The tone signals may be transmitted over telephone lines to a remote computer. DTMF tones may instruct a remote computer (e.g., a central server operated by a cellular telephone service) to perform a certain instruction or set of instructions. The transmission of DTMF tones may be initiated by a user in response to one or more prompts provided by a computer configured with Interactive Voice Response (IVR) functionality, as is known in the art. The terms "IVR" or "IVRU" refer to interactive voice response technology that permits a user to use a touch-tone telephone to interact with a computer (e.g., a server), for example, to acquire information from or enter data into a database associated with the computer. In a manner known in the art, a computer configured with IVR technology may output audible prompts to a user's telephone through a telephone network. Alternatively or additionally, a QWERTY-style keyboard may be included as part of a device.

In one or more embodiments, a microphone may be incorporated as part of a device (e.g., part of a cell phone or conventional telephone handset), or may comprise a removable earphone that may be operatively connected to the device. As is known in the art, a microphone may be configured to work in conjunction with a local or remote speech-to-text conversion module/software.

In one or more embodiments, a digital camera may be incorporated as part of a device. For example, a cell phone may comprise a digital camera hardware and appropriate software. A commercially available cell phone demonstrating significant picture resolution is the SCH-V770 7-megapixel camera phone from Samsung.

In one or more embodiments, a camera phone may be configured with software which enables the capture and deciphering of bar codes. For example, Optical Intelligence™ software from Scanbuy, Inc. is a software application for camera phones and camera-enabled PDA that allows such devices to read and translate barcodes.

In one or more embodiments, a bar code scanner or other type of optical scanner may be incorporated as part of a device. For example, a cell phone or PDA may comprise a bar code scanner. Bar code scanning hardware and software is available from Symbol Technologies, Inc. Any other type of optical scanner may be employed, including but not limited to those which use charge-coupled device (CCD) or photomultiplier tube (PMT) technology for reading printed information (text, illustrations), digitizing the information and translating the information to a processing apparatus (e.g., a microprocessor).

In one or more embodiments, a biometric device may be incorporated as part of a device, so that a particular user may be identified and/or authenticated. Biometric devices include finger print (e.g., thumb print) readers. Thus, in one or more embodiments, a cellular telephone may feature a finger print reader, such as the LG-LP3550 from LG Electronics. The LG-LP3550 features an integrated 2.2-inch LCD screen, 3-megapixel digital camera, MP3 player, and AuthenTec's EntrePad 2510 fingerprint sensor. The sensor may be positioned directly below the display to provide single-handed control.

In some embodiments, an output device comprises an audio module, such as an audio speaker, that outputs information to users audibly. A speaker may be incorporated as part of a device (e.g., part of a cell phone or a conventional telephone handset), or may comprise a removable earphone that may be operatively connected to the device. Exemplary removable earphones for use in conjunction with cell phone embodiments are manufactured by Plantronics, Inc. and Jabra Communications. Speakers may be used to output and/or produce prerecorded and/or synthesized sounds which may be stored as computer files in a variety of formats (e.g., .wav files, .mp3 files, .wma files). Alternatively or additionally, speakers may be used to output or relay, in substantially real time, sounds received through the input device of another device, such as another telephone.

In one or more embodiments, an output device may comprise one or more monitors and/or screens for outputting information to users visually. For example, a device may include a liquid crystal diode (LCD) screen, a cathode ray tube (CRT) monitor, and/or a plasma screen. In one or more embodiments, an output device may comprise one or more light-emitting diodes (LEDs), and/or one or more conventional light bulbs. In one or more device, an output device may vibrate, e.g., to notify a user of an incoming phone call, etc.

In one or more embodiments, a device may incorporate hardware that provides both input and output functionality so that commands and data may be received and/or output by the device. Such devices, including but not limited to touch screens and voice/data transceivers, may be referred to as input/output devices.

A touch screen may provide both input (keypad) and output (display) functionality. Touch screens commonly used by Personal Digital Assistant (PDA) or cell phone designers may be suitable for the present invention. For example, touch screens such as those incorporated into PalmOne® brand Treo PDA cell phones may be employed in a device of the present invention. Touch screens may comprise: (1) a first (e.g., outer-most) hard-surface screen layer coated with an anti-glare finish, (2) a second screen layer coated with a transparent-conductive coating, and (3) a third screen layer comprising a glass substrate with a uniform-conductive coating. Further, such touch screens may be configured to detect input within a determined positional accuracy, such as a standard deviation of error less than ±0.080-inch (2 mm). The sensitivity resolution of such touch screens may be more than 100,000 touchpoints/in$^2$ (15,500 touchpoints/cm$^2$) for a 13-inch touch screen. For such touch screens, the touch activation force required to trigger an input signal to the processor (described herein) via the touch screen is typically 2 to 4 ounces (57 to 113 g). Additionally, touch screens for use may be resistant to environmental stressors such as water, humidity, chemicals, electrostatic energy, and the like. These and other operational details of touch screens (e.g., drive current, signal current, capacitance, open circuit resistance, closed circuit resistance, etc.) are well known in the art.

As used herein a voice and/or data transceiver may comprise a transmitter and receiver housed together in a single unit and having some circuits in common. In one or more embodiments, a device may include one or more voice and/or data transceivers, so that voice and/or data may be (a) received by the device from another computer or device, and/or (b) transferred to another computer or device. Data and/or voice transceivers may comprise one or more transceivers capable of receiving and/or sending information wirelessly via electromagnetic frequency radiation, including but not limited to radio (AM, FM, short wave, cellular), microwave, and/or infrared signals. Thus, in one or more embodiments, one or more data and/or voice transceivers may comprise one or more modems, including but not limited to conventional modems, cable modems, cellular modems, etc.

In one or more embodiments, devices may be handheld and easily movable. Handheld devices may communicate with one or more other devices through any combination of wired and/or wireless communication medium (as described further below).

A user device may comprise a handheld device, such as a telephone. In one embodiment, a user device may comprise a mobile telephone such as a cellular telephone (or "cell phone"). For illustrative and exemplary purposes, descriptions of some embodiments may refer to a cell phone, but it will be understood that other types of mobile telephones, handheld devices, and/or computing devices may be used. Some cellular phone casings and computing hardware adaptable for use in conjunction with one or more embodiments are commercially available from LG Electronics, Motorola, Nokia, PalmOne, Panasonic, Samsung, Sanyo, Siemens, and Sony-Ericsson.

A user device may comprise any handheld device, including but not limited to: Personal Digital Assistants (PDAs), digital music players (e.g., MP3 players such as Apple's iPod™), and dedicated devices. In one or more embodiments, a dedicated device may be manufactured for use with one or more embodiments of the present invention.

In one or more embodiments, a device may comprise a central computer (or server) that communicates, through any combination of wired or wireless communications media, with other computers or devices. A central computer may facilitate communications (telephonic, text-based SMS messaging, FTP, etc.) between two or more other computers or devices.

In one or more embodiments, a server may comprise one or more computers, communications devices or switching devices that facilitate telephonic communications between user devices. Such a system may be operated and maintained by a cellular service provider (or "carrier"), such as Cingular Wireless, Verizon Wireless, Nextel, Sprint, or T-Mobile. In one or more embodiments, one or more computers or switching devices may comprise a carrier's Mobile Telephone Switching Office (MTSO) for one or more geographic regions. In embodiments where a central computer is operated by a cellular service provider, customers may be more willing to post items for sale and/or purchase items as described herein because such functionality may be facilitated by an established, national consumer brand.

In one or more embodiments, one or more computers (or Web servers) or other devices may host or otherwise facilitate the transfer or downloading of digital files to and/or from remote computers or devices (e.g., personal computers, cellular phones).

In one or more embodiments, as would be apparent to one of ordinary skill, various network communications equipment may be employed to facilitate communications between devices or computers. Such network communications equipment includes but is not limited such computers or devices as backbones, bridges, gateways, hubs, mainframes, modems, network access points, repeaters, routers and the like.

Various embodiments described in this disclosure may utilize any number and/or combination of network communications configurations, formats, mediums, protocols and standards. Any type and combination of analog or digital wired or wireless network communications configurations, formats, mediums, protocols and standards may be employed to facilitate communications between devices or computers. Some examples are described in this disclosure, and others will be apparent to those skilled in the art in light of this disclosure.

Devices or computers may transfer audio data. Devices or computers may transfer voice data so that users may engage in verbal dialog. Voice data may be transmitted in any way known in the art, including but not limited to telephonically, via 2-way radio transmission, and/or through voice-over-IP (VoIP) services. Moreover, in some embodiments, a central computer and/or a device may be configured to store and/or retrieve verbal messages recorded in a voicemail box. Devices or computers may transfer data in a manner that permits users to receive and access music files. In one or more embodiments, one or more computers (servers) or devices may host or otherwise facilitate the transfer or downloading of digital music files (e.g., MP3 files) to or from remote computers or devices (e.g., personal computers, cellular phones), so that users may send, receive and/or access music files.

Devices or computers may transfer data in a manner that permits users to exchange text-based messages synchronously (via instant text-messaging between computers; SMS messaging between cell phones) or asynchronously (e.g., via email, FTP, etc.). In one or more embodiments, one or more computers (servers) or devices may host or otherwise facilitate the transfer or downloading of digital files to or from remote computers or devices (e.g., personal computers, cellular phones), so that users may send, receive and/or view text-based content that is created, stored and/or transferred according to any language, format or protocol, including but not limited to HTML, cHTML, DHTML, FTP, RTF, etc.

Devices or computers may transfer data in a manner that permits users to exchange images and picture files. In one or more embodiments, one or more computers (servers) or devices may host or otherwise facilitate the transfer or downloading of digital image files (e.g., .JPG, .JPEG, .JPE, .GIF, .BMP files) to or from remote computers or devices (e.g., personal computers, cellular phones), so that users may send, receive and/or view pictures.

Devices or computers may transfer data in a manner that permits users to receive and view video images. In one or more embodiments, one or more computers or devices may facilitate the transfer of real-time, streaming video captured through a lens of a device. Thus, in one embodiment, a user of a cellular telephone may watch video taken from another user's camera phone in real time or substantially real time. Such an embodiment may allow a prospective buyer of an item to command a remote inspection of an item posted for sale by another user of the system. In one or more embodiments, one or more computers or devices may facilitate the transfer of pre-recorded video footage, including, for example, .AVI files.

One or more types of network configuration that may be included in a system include, but are not limited to LANs (including ethernet and token-ring networks), WLANS (wireless LANs), WANs, Asynchronous Transfer Mode (ATM) networks, Public Switched Telephone Networks (PSTN) and cellular networks, Integrated Switch Digital Networks (ISDN), and/or Synchronous Optical Networks (SONET). Devices and computers may be capable of receiving and/or sending data and/or voice information through any combination of wireless and/or wired transmission mediums. Wireless media include electromagnetic frequency radiation, including but not limited to radio (AM, FM, short wave, cellular), microwave, and/or infrared signals. Wireless standards, formats and protocols include, but are not limited to the GSM, TDMA and/or CDMA radio spectrum utilization standards, and Wireless Application Protocol (WAP) standards for accessing online services from a mobile phone. Wired transmission media include twisted pair cable (e.g., shielded twisted pair, unshielded twisted pair), coaxial cable, and fiber optic cable.

Devices that are in communication with each other need not be in continuous communication with each other, unless expressly specified otherwise. In addition, devices that are in communication with each other may communicate directly or indirectly through one or more intermediaries, including but not limited to one or more computers or switches operated by a cellular service provider.

FIG. 1A depicts an example system 100 in accordance with one or more embodiments contemplated by this disclosure. A central computer 110 (e.g., a server, a telecommunications hub) is in communication with a camera phone of a seller 120 and one or more buyer devices 130. Although only one camera phone is indicated it will be understood that any number of camera phones and/or buyer devices may be incorporated in system 100. Various examples of camera phones and devices that may be used by buyers and other types of users are described in this disclosure.

Figure 1B:
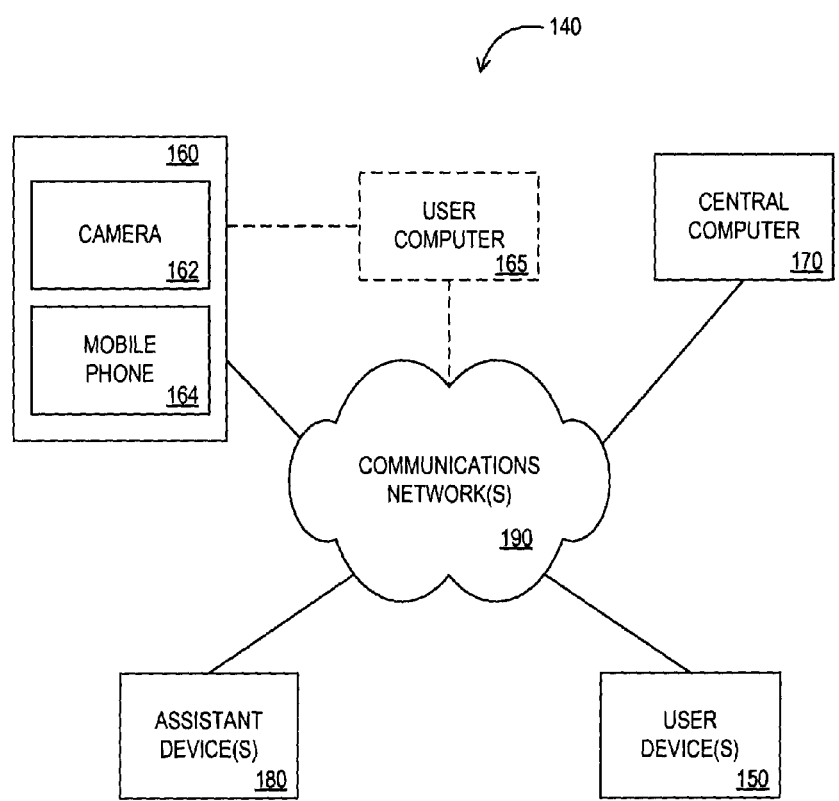
FIG. 1B depicts an example system in accordance with one or more embodiments of the present invention.

FIG. 1B depicts an example system 140 in accordance with one or more embodiments contemplated by this disclosure. System 140 comprises various devices in communication via one or more communication networks 190. It will be understood that some types of devices may communicate using one type of network, that other devices may communicate using a different type of network, and that any particular type of device may be operable to communicate using more than one type of network. In particular, system 140 includes one or more user devices 150 (e.g., a seller device, a buyer device). One user device 160 (e.g., a camera-enabled cell phone) includes a camera 162 and a mobile phone 164. It will be understood that such a device 160 may be referred to as a camera, a phone, or a camera phone. The device 160 is optionally in communication with a user computer 165 (e.g., for transmitting and/or receiving audio, video, text, and/or picture data via the Internet). One or more assistant devices 180 may be used fUser device 160 may be in communication via a cellular telephone network, for example, with a cellular service provider, Example Processes and Functions According to one or more embodiments of the present invention, apparatus, systems and methods facilitating the sale of items may generally allow for (1) "posting" items for sale, (2) "shopping" or "browsing" for items, (3) "discovery" or communications prior to purchase, and (4) "consummation" of sales. Other alternative or additional types of steps are also described. It will be readily understood that various embodiments described in this disclosure may include one, more than one (e.g., in various combinations), or all of these general types of functions. Each of these general "phases" or categories of functionality will now be discussed in more detail.

Figure 2:
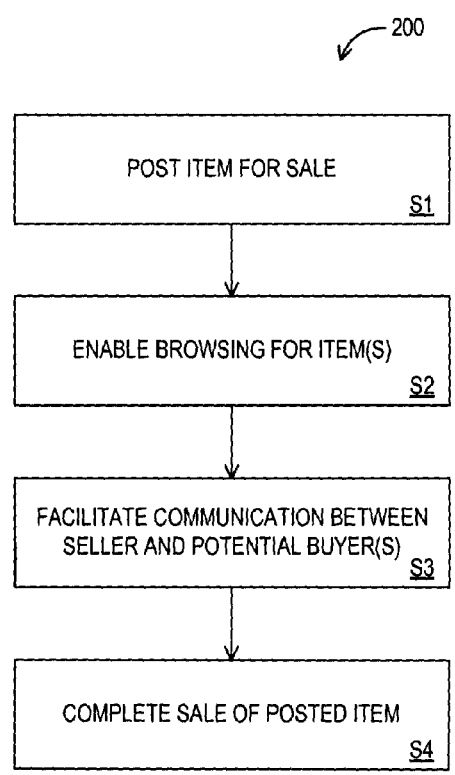
FIG. 2 is a flowchart for a process in accordance with one or more embodiments of the present invention.

FIG. 2 is a flowchart describing an exemplary process 200 for the sale of an item. The exemplary steps may be performed by a central computer (and/or an entity associated with the central computer, such as a human assistant). At S1, an item is posted for sale. At S2, users are allowed to browse or shop for the posted item. At S3, if necessary, communication is facilitated between the seller of a posted item and one or more potential buyers. At S4, sale of the posted item is completed. Various embodiments of the steps S1-S4 are described below, and other examples will be readily understood by those skilled in the art upon reading this disclosure.

Some example embodiments for posting an item for sale will now be described. According to one or more embodiments, a process begins with a seller posting an item for sale by providing an indication of the item to a central computer (a "posting" step). By posting the item for sale, other users (i.e., potential buyers) can subsequently (e.g., at a "shopping" step, described herein) become aware of the items for sale by using devices such as cell phones or personal computers. In one or more embodiments, at a posting step, a central computer (and/or an entity associated therewith) may receive an indication of an item for sale from a remote device operated by a seller (e.g., a seller's camera phone, a PDA, a personal computer).

In one or more embodiments, at a "posting" step, a seller takes a picture of an item he wishes to sell and transmits the picture to a central computer. In one or more embodiments, a picture may be taken with a camera phone. Thus, in one or more embodiments, at a "posting" step, a central computer receives, from a device (e.g., a cell phone, a PDA, a personal computer) one or more digital pictures.

Similarly, in one or more embodiments, a seller may record video footage of an item he wishes to sell, and may transfer the same (e.g., digitally) to the central server. Thus, in one or more embodiments, at a "posting" step, a central computer receives, from a device (e.g., a cell phone, a PDA, a personal computer) one or more video files.

In one or more such camera phone embodiments, a camera phone may be programmed to display, upon the recording of a picture or a video, a "hot key" button labeled, for example, "sell an item", "post an item", "list an item" or the like, so that upon the seller's pressing of the button, the camera phone may (1) prompt the seller for more information (e.g., a verbal annotation describing the item pictured in the recorded picture or video, as discussed herein), and/or (2) transmit the picture or video file to a central computer.

Alternatively or additionally, in one or more embodiments, a seller may utilize a device (e.g., a camera phone) to provide, to the central computer, a verbal description of the item he wishes to sell. In one embodiment, the user's device (e.g., camera phone) may receive a verbal description through a microphone and may store (e.g., in RAM, in a SIM card) the verbal description in association with a previously recorded digital picture and/or video file. The picture and/or video, in conjunction with the verbal "annotation" thereto, may be sent as a "packet" of information to the central computer. Compared to prior art processes for listing items for sale on an electronic network (which typically require typing item descriptions at a personal computer), the inventive process of taking pictures with a cell phone and providing voice annotation in accordance with some embodiments provides a significantly easier and quicker way for a user to list items for sale.

Figure 3:
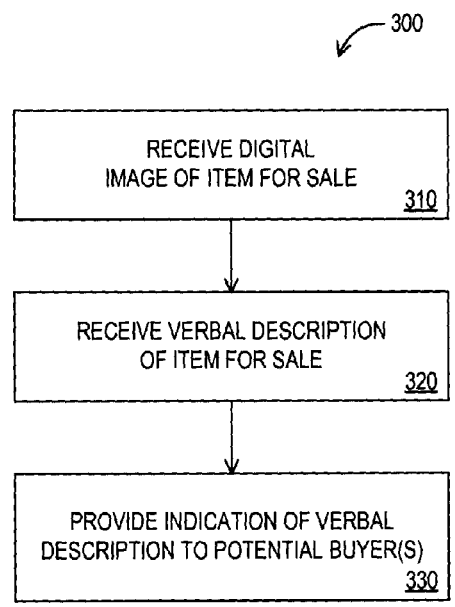
FIG. 3 is a flowchart for a process in accordance with one or more embodiments of the present invention.

FIG. 3 provides an example process 300 in accordance with one or more embodiments for posting an item for sale. The process 300 may be performed, for example, by a central computer (e.g., in communication with a camera-enabled telephone and/or human assistant). At step 310, a digital image is received (e.g., from a camera phone of a seller) of an item to be posted for sale. At step 320, a verbal description of the item is received (e.g., as an audio file). Optionally, the verbal description is converted to text (e.g., by a computing device, by a human assistant). Optionally, an indication of the verbal description is stored (e.g., a text version of the verbal description is stored in a database in association with an identifier that identifies the seller and/or the item). At step 330, an indication of the verbal description is provided to at least one potential buyer. For example, the verbal description may be transcribed into text and the text version of the description is displayed to an online shopper. Additional examples of the steps of process 300 are provided in this disclosure.

In one embodiment, after the user notifies the central computer that he wishes to list an item for sale (e.g., after pressing a "hot key" button labeled "sell an item" and transmitting an image of an item to the central computer), the central computer may prompt the user (e.g., via IVR) for a verbal description of the item, which the seller may provide, for example, into the microphone of a cellular phone. Upon receiving the verbal description, the central server may record the verbal description. In one or more embodiments, the verbal description may be stored in conjunction with a previously received video and/or picture of the subject item the seller wishes to sell.

After receiving a verbal description from a remote device, a central computer may convert the verbal description to text using speech-to-text conversion software. Compared to prior art processes for listing items for sale on an electronic network (which typically require typing item descriptions at a personal computer), the inventive process of taking pictures with a cell phone, providing simple voice annotation and having a central computer facilitate the transcription of the voice annotation to text provides a significantly easier and quicker way to list items for sale.

After receiving a verbal description from a remote device, a central computer may provide the verbal description to a human assistant associated with the central computer, who may in turn convert the verbal description to text manually by listening to the verbal description and typing the verbal description into a computer keyboard so that the resulting text may be stored and made available to prospective buyers. In some embodiments, communication with a human assistant may comprise with a terminal or other device operated by the human assistant, as will be readily understood by those skilled in the art.

In one or more embodiments, a human assistant of the central computer may be employed on an "as needed" or other basis, as described in one or more embodiments of Applicant's U.S. Pat. No. 5,862,223 entitled METHOD AND APPARATUS FOR A CRYPTOGRAPHICALLY-ASSISTED COMMERCIAL NETWORK SYSTEM DESIGNED TO FACILITATE AND SUPPORT EXPERT-BASED COMMERCE, issued Jan. 19, 1999; Applicant's U.S. patent application Ser. No. 09/112,131 entitled METHOD AND APPARATUS FOR A CRYPTOGRAPHICALLY-ASSISTED COMMERCIAL NETWORK SYSTEM DESIGNED TO FACILITATE AND SUPPORT EXPERT-BASED COMMERCE filed Jul. 8, 1998 and now abandoned; Applicant's U.S. Patent Application No. 60/450, 459 entitled SYSTEM AND METHOD FOR THE REMOTE MONITORING OF CRITICAL CIVILIAN INFRASTRUCTURE filed Feb. 26, 2003; the entirety of each of which is incorporated by reference herein for all purposes. Again, compared to prior art processes for listing items for sale on an electronic network (which typically require typing item descriptions at a personal computer), the inventive process of taking pictures with a cell phone, providing simple voice annotation and having a central computer facilitate the transcription of the voice annotation to text provides a significantly easier and quicker way to list items for sale.

After receiving a verbal description from a remote device, a central computer may store the verbal description (e.g., in a local or remote database) for later reference. For example, stored verbal descriptions may be subsequently listened to by prospective buyers, so that buyers can audibly hear sellers speak firsthand about their items, giving the buyers an opportunity to hear the sincerity, candidness, detail, intonation, etc. with which they speak about their items. Such information cannot be ascertained by a buyer in a prior art system where shopping is based on text.

Alternatively or additionally, the buyer's description (including voice annotation) may be cryptographically stored in a manner similar or identical to that which is described with reference to Applicant's U.S. Pat. No. 6,529,602 B1 entitled METHOD AND APPARATUS FOR THE SECURE STORAGE OF AUDIO SIGNALS, issued Mar. 4, 2003; and Applicant's U.S. patent application Ser. No. 11/183,359 entitled METHOD AND APPARATUS FOR THE SECURE STORAGE OF AUDIO SIGNALS filed Jul. 18, 2005 and issued as U.S. Pat. No. 7,519,836 on Apr. 14, 2009; the entirety of which is incorporated herein for all purposes. The ability to prevent editing or tampering with the seller's recorded description made possible by such cryptographically secure arrangements may be valuable in transactions where the seller's initial representations may become important in resolving disputes, etc.

In some embodiments, the central computer and/or the operator thereof (e.g., a cellular service provider, such as Verizon Wireless or Cingular Wireless) may utilize a human assistant to help sellers post items for sale. A human assistant may be an employee of the central computer's owner/operator (e.g., a customer service representative, or "CSR"). Alternatively or additionally, a human assistant may be a customer or subscriber of the services offered by the central computer, or any other user of a computer network (e.g., anyone with Internet access; anyone with a cellular service account). By agreeing to provide assistance to sellers (and/or buyers, as described herein), such human assistants can earn (1) ratings, (2) cash, (3) credit towards service bills, (4) credit towards items listed for sale on the network, (5) sweepstakes entries, and/or (6) any other form of compensation.

Human assistants can be remotely located from the central computer, and may communicate with the central computer or any other device described herein through any communication network described herein.

The central computer may facilitate communication between sellers and human assistants in one or more ways. In some embodiments, the central computer may telephonically connect a seller to a human assistant, so that a conversation may ensue about the item the seller wishes to post for sale. Such a telephonic connection may be initiated upon the seller's sending a picture, pressing a particular button (e.g., a hot key as described herein), dialing a phone number, or the like. In some embodiments in which communication may be text based, sellers and human assistants may communicate through text messaging (e.g., SMS messaging through cell phones). In some embodiments, sellers and human assistants may share pictures and/or video.

Human assistants may be assigned to narrow product categories (e.g., calculators, women's shoes, videogames, etc.) so that, over time, they gain and/or improve their base-line expertise, fluency and instinctive understanding about their particular market. The knowledge a human assistant gains or otherwise possess about a particular product category or subcategory can be used to help a seller post an item for sale, reducing or eliminating the need for a seller to himself learn aspects of the particular market, and as compared with prior art systems for selling items through an electronic network, dramatically reducing the time required to post an item for sale.

When a seller initially notifies the computer network that he wishes to place an item for sale (e.g., by pressing one or more buttons on a cellular phone), the seller may be connected with one or more human assistants, as described herein. The seller may be matched with one or more human assistants based on the category or subcategory of goods the seller wishes to sell. Call routing may be facilitated in one or more ways.

In one or more embodiments, a human operator of central computer (e.g., an employee of the central computer's operator) receives information sent by the seller (e.g., a picture of an item; a voice annotation describing the item). The human operator may review the information and thereby determine the appropriate category or subcategory of goods, and route the call and/or transfer the information (e.g., a picture; a voice annotation) to an appropriate human assistant assigned to the identified category or subcategory.

In one or more embodiments, the central computer may employ artificial intelligence methods or other software-based methods to route sellers to appropriate human assistants. For example, in one or more embodiments, the central computer may receive a picture from a seller, and may compare the picture to one or more stored pictures to determine a degree of similarity. Based on whether or not a given picture is determined to be similar to a picture of an item representing a particular category, the seller's call may be routed to a human assistant assigned to the given category. Alternatively or additionally, the central computer may transcribe and/or otherwise process an audio-based description (e.g., a "verbal annotation" to a picture, as described herein) to determine an appropriate category and/or human assistant. In one or more embodiments, upon determining a potential category and/or assistant, a human assistant may confirm the central computer's determination, so that the seller's call can be routed to the initially identified human assistant, or otherwise evaluated to determine an appropriate human assistant.

Human assistants may help sellers post items in one or more ways, including but not limited to the following functions. Human assistants may answer questions sellers may have about the fair market value of a particular item. Human assistants, in helping the seller to determine a fair price to ask, may speak with the seller regarding the item, asking about the item's characteristics and suggesting a price (e.g., "similar items typically sell for $X"). Human assistants may ask sellers to transmit pictures or video (real-time, streaming video and/or recorded video) so that human assistants may view the condition of the item, which may be relevant in determining a fair price. Human assistants may converse with the seller, asking the seller questions about the item (e.g., "What color is it? Are there any scratches?"). During and/or after the conversation, the human assistant may type a description of the item, so that the typed description may be made available to prospective buyers through the central computer. In essence, the human assistant may verbally "walk" the seller through a quick process, at the end of which a listing has been created. Such a posting process is significantly quicker and easier than prior art processes for listing items for sale on an electronic network.

Human assistants can speak with and/or defer to other human assistance who may have more relevant expertise and knowledge about a particular product or area.

Human assistants can help gather clear, illustrative pictures of the subject item. For example, human assistants can view pictures of items taken by sellers and ask sellers to submit new pictures if the initially submitted pictures are of poor quality. For example, a human assistant may ask a seller, "can you provide another picture from a higher angle and with more light?" Also, a human assistant can review a plurality of pictures sent by a seller, and select one or more pictures that best display the subject item. The selected pictures may then be incorporated as part of a listing, which may be made available to prospective buyers through the central controller. Further, in one or more embodiments, a human assistant may "seize" shutter control of a seller's camera phone, so that the human assistant may use a personal computer or cell phone to dictate when the seller's camera phone releases a shutter control to record an image.

In one or more embodiments, human assistants may market additional services provided and/or sold by the operator of the central computer. For example, human assistants may promote or offer for sale enhanced marketing tools to make posted items more attractive to, or easier to find by, prospective buyers. For example human assistants may offer to adorn or enhance standard style listings with particular icons, fonts, etc. so that, when browsing items, prospective buyers may be initially more attracted to the seller's listing. Alternatively or additionally, human assistants may sell offer a seller the ability purchase a "priority ranking" so that his listing may be presented to a prospective buyer before other listings (e.g., sorted higher in a list; presented in sequence before other listings, etc.).

Human assistants may ask sellers for "purchase inquiry" parameters, so that seller may set the times and circumstances under which sellers are willing to accept sales calls from prospective buyers. For example, a seller may specify the times of day that he may or may not want to receive calls about a posted item. The human assistant may record (e.g., in a database) the parameters set by the seller, so that incoming calls to the seller are first screened to determine whether or not they should indeed be forwarded to the seller. A seller may only want to receive calls from certain buyers (buyers having a certain rating, credit card backed offers, buyers offering a certain amount, etc.). The human assistant may record (e.g., in a database) the parameters set by the seller, so that incoming calls to the seller are first screened to determine whether or not they should indeed be forwarded to the seller. A seller may select call notification data (e.g., ring tones) that may be provided to the seller through the seller's cell phone if a one or more rules are met. For example, a particular ring tone may be selected to identify calls from prospective buyers (as compared to normal business or personal phone calls). A seller, for example, may elect to direct all sales-related calls directly to voicemail.

In one or more embodiments, human assistants are not employees of the operator of the central computer, but are instead independent contractors who can make themselves available substantially any time they want work. Such human assistants may work remotely by communicating with the central computer and/or devices of sellers and buyers through devices of their own, such as personal computers or cell phones. Apparatus, systems and methods for providing the recruitment, management, and compensation of such remote "piecework" workers are described in one or more embodiments of Applicant's U.S. Pat. No. 5,862,223 entitled METHOD AND APPARATUS FOR A CRYPTOGRAPHICALLY-ASSISTED COMMERCIAL NETWORK SYSTEM DESIGNED TO FACILITATE AND SUPPORT EXPERT-BASED COMMERCE, issued Jan. 19, 1999; Applicant's U.S. patent application Ser. No. 09/112,131 entitled METHOD AND APPARATUS FOR A CRYPTOGRAPHICALLY-ASSISTED COMMERCIAL NETWORK SYSTEM DESIGNED TO FACILITATE AND SUPPORT EXPERT-BASED COMMERCE filed Jul. 8, 1998; and Applicant's U.S. Patent Application No. 60/450,459 entitled SYSTEM AND METHOD FOR THE REMOTE MONITORING OF CRITICAL CIVILIAN INFRASTRUCTURE filed Feb. 26, 2003; the entirety of each of which is incorporated by reference herein for all purposes. It should be noted that the employment of consumers as "pieceworkers" in the inventive system is particularly advantageous as it leverages the deep, experiential knowledge that ordinary consumers have about the goods posted for sale on the network. Moreover, labor costs associated with such a "piecework" system may be significantly lower than employing a full or part-time workers.

Pricing for items may be determined in various ways. In one or more embodiments, sellers are charged on an as-used (e.g., per minute) basis for receiving live assistance from human assistants. Such charges may be added to the outstanding balance of a seller's existing telephone account. In one or more embodiments, sellers are charged a flat price per posting (e.g., $0.30/posting). Such charges may be added to the outstanding balance of a seller's existing telephone account. In one or more embodiments, sellers are charged a flat price per a period of time. For example, for $X/month, sellers may post an unlimited number of postings not exceeding 1 gigabyte of storage on the central computer. Such charges may be added to the outstanding balance of a seller's existing telephone account. In one or more embodiments, posting may be free (or deeply discounted) for network subscribers (e.g., cellular subscribers, customers of an Internet Service Provider).

A seller may identify himself to or be identified by the central computer in various ways. In one or more embodiments, a seller need only initiate a network connection with (e.g., a phone call to) a central computer in order for the central computer to determine his identity. For example, because a seller may already be a subscriber of a given cellular provider, the provider's central computer may be able to determine the seller's identity upon receiving a call from the seller (e.g., through Automatic Number Identification technology; by receiving a Mobil Identification Number; by receiving an Electronic Serial Number). Thus, in one or more embodiments, a seller need not engage in a "log on" process, such as by providing a username and/or password. Accordingly, one or more embodiments of the invention reduce or eliminate the inconveniences of establishing and using a Web-style user account.

Once complete and ready for posting, the packet of posting information (e.g., one or more pictures of an item, a verbal description, a textual description) may be made available for browsing and/or purchase by one or more users of the particular communications network (e.g., cellular, Internet), as described herein.

Because, through one or more embodiments of the present invention, posting of an item for sale can be achieved through a cellular telephone, one or more embodiments of the present invention permits use by a wide range of individuals, including those who may not be "computer literate", may not own computers or have email accounts, and may not have credit or debit cards and/or associated financial accounts.

In one or more embodiments, a central computer (and/or an entity associated therewith) may facilitate shopping or browsing for items, as described in this disclosure. According to one or more embodiments, a prospective buyer shops or browses for an item to purchase. Thus, in one or more embodiments, a central computer may facilitate the shopping or browsing for items by one or more remote prospective buyers.

The central computer may facilitate shopping or browsing for items by prospective buyers over any one or more of the communications network described herein (e.g., the PSTN, Internet), through any one or more of the devices described herein (e.g., personal computer, cell phone). In some embodiments, the central computer and/or operator thereof (e.g., a cellular service provider, such as Verizon Wireless or Cingular Wireless) may utilize a human assistant (as described herein) to help buyers find items for sale.

According to one or more embodiments, a buyer who knows approximately what she is looking for (e.g., a certain DVD, a tennis racket, a tricycle) can use a personal device to retain a human assistant to provide shopping assistance. In one or more embodiments, a buyer who wishes to utilize a human assistant can use a personal device (e.g., a cell phone, a personal computer) to first contact the central computer. The central computer would therefore receive a request to utilize a human assistant from the prospective buyer. The request to utilize a human assistant may be preceded by or accompanied with a general or specific pictorial, verbal and/or textual description of the item the buyer wishes to purchase.

In one or more embodiments, a buyer may contact the central computer, which may operate IVR software to guide prospective buyers. Prospective buyers may navigate through one or more IVR menu options to leave a verbal description (e.g., in a voice mail box) describing the item she wishes to purchase. The central computer and/or a human operator may analyze the item description so that the message may be provided to a human assistant in an appropriate category or subcategory of goods.

Alternatively or additionally, buyers can be connected (telephonically; through SMS messaging or other text messaging) in real time or substantially real time to a human assistant in a particular product category or subcategory.

Alternatively or additionally, a buyer may be provided an email address or phone number of a human assistant, so that the buyer may directly provide the human assistant with a general or specific pictorial, verbal and/or textual description of the item the buyer wishes to purchase.

Once an initial product description is transmitted to a human assistant, the human assistant may seek additional information from the prospective buyer. In embodiments where buyers and human assistants engage in a real-time or substantially real-time, synchronous or substantially synchronous communication (e.g., telephonically; through SMS text messaging), the human assistant may ask the buyer one or more questions during the dialog. For example, after receiving an indication of the product the prospective buyer is looking for, the human assistant may ask the buyer about her budget, any specific brands she has in mind, how far she would be willing to travel, the condition needed, the age and gender of the intended user of the product, etc. Alternatively, such questions may be asked and answered through any available asynchronous messaging medium (e.g., voice mail, email, etc.) described herein.

In one or more embodiments, after a human assistant is provided with a general or specific pictorial, verbal and/or textual description of an item, and any other associated information (e.g., the buyer's budget, etc.), the human assistant may utilize a device (e.g., personal computer, a cellular telephone) to find one or more potentially suitable items posted for sale by one or more sellers. The human assistant may use any known database querying techniques, search engines, or other searching tools and methods to identify potentially suitable items posted for sale through the central computer.

Alternatively or additionally, in one or more embodiments, the human assistant may initiate the running of artificial intelligence or other software methods on the central computer or another device to compare pictures submitted from prospective buyers to pictures of items posted for sale. Once the central computer or other device (e.g., the human assistant's personal computer or cell phone) has identified potentially relevant matches, the human assistant may review the matches to confirm their relevancy before suggesting them to the prospective buyer, as described further herein.

After the human assistant identifies one or more potentially suitable items posted for sale, the human assistant may initiate notification of the prospective buyer through the central server or otherwise. In one or more embodiments, the human assistant and/or central control may transmit pictures and/or descriptions of the potentially suitable item(s) to the prospective buyer for review.

For example, in one embodiment, a prospective buyer may receive, through her cell phone, one or more images and accompanying textual descriptions of one or more products preliminarily identified by the human assistant and/or central computer. The prospective buyer may view the text and/or pictures on an LCD screen of her cellular telephone, or on a monitor of a personal computer. Alternatively or additionally, the prospective buyer may utilize a user interface or input device of a cellular telephone or personal computer to select a particular item, and upon receiving the selection, the central computer may transmit any verbal description initially provided by the seller (e.g., a voice mail message describing the item, an MP3 file containing an item description). In this manner, the prospective buyer may audibly hear, firsthand, the seller's description of the subject item.

When reviewing items suggested by a human assistant as potential items of interest, the buyer may rate the suggested items, so that the human assistant receives more information to help guide further searching. For example, in one embodiment, a prospective buyer may receive, on her cell phone, one or more descriptions of items preliminarily identified by a human assistant. The buyer may scroll through the items using an input device such as a keypad, dedicated cursor control, stylus, or the like. After reviewing each suggested item, the prospective buyer may rate each suggested item, for example, by entering a number into the cell phone's keypad (e.g., 1 for least relevant, 9 for closest, # to indicate that the buyer would like to purchase the item). In this manner, the shopping experience may be a "process of elimination" for the buyer, rather than a time consuming, blind search, as typifies prior art methods for finding items for sale on an electronic network.

Further, in one or more embodiments, a human shopping agent could converse with the buyer (e.g., audibly through a telephonic connection; through text-based SMS messaging) while she browses suggestions, so that the shopping agent could learn how to suggest more relevant postings.

Thus, the ability to utilize a human assistant permits buyers to shop for items without having deep knowledge about the products in which they are interested. Moreover, unknowledgeable buyers need not spend significant time and energy researching how to shop for a particular item (e.g., how to evaluate the condition of a particular item; what is a fair price).

While the buyer is shopping, traditional phone calls may be routed to voice mail or treated in accordance with stored preemption rules (e.g., "interrupt me for business calls"). Thus, one or more embodiments include receiving, from a prospective buyer, one or more rules or preferences governing the management of phone calls during a shopping or browsing session.

In one or more embodiments, prospective buyers may be charged on an as used basis (e.g., per minute) for shopping activity and services, such as browsing posted items with or without the assistance of a human assistant. Such charges may be added to the outstanding balance of a prospective buyer's existing telephone account.

In one or more embodiments, buyers are charged a flat price per period of time for shopping activity and services, such as browsing posted items with or without the assistance of a human assistant. Such charges may be added to the outstanding balance of a prospective buyer's existing telephone account.

In one or more embodiments, shopping activity may be free or substantially discounted to users of a particular communications network (e.g., subscribers of Cingular or Verizon cellular service may be permitted to shop for free or at a discount). In one or more embodiments, any fees for shopping activity may be waived or refunded if the prospective buyer purchases an item (e.g., within a period of time).

In one or more embodiments, if a prospective buyer is interested in an item, she can continue the process by causing a device (e.g., a cell phone, a personal computer) to transmit a signal to the central computer, which can facilitate pre-purchase communications and negotiations (or "discovery"), as described further herein. Such a signal may be transmitted upon the buyer's pressing a button on a device, such as a hotkey labeled "talk to seller" or the like.

In one or more embodiments, a central computer (and/or an entity associated therewith) may facilitate pre-purchase communications and/or negotiations (or "discovery") between one or more prospective buyers, a seller and/or a third party (e.g., a human assistant, as described herein).

In one or more embodiments, counterparties such as a prospective buyer and a seller may communicate with each other through one or more asynchronous communications media or methods, including but not limited to email, voicemail, postal mail, etc. For example, in one or more embodiments, a central computer may create and/or designate voicemail boxes for every buyer, seller, and/or posted item. Thus, in one embodiment, upon the posting of an item for sale, the central computer may create a voicemail box corresponding to the item, so that prospective buyers may further inquire about the item by leaving the seller a voicemail message containing questions, requirements (e.g., intended uses), etc. The seller may respond by leaving the prospective buyer a message in a voicemail box designated for the prospective buyer.

In one or more embodiments, the central computer may disable voicemail boxes after a period of time or upon the occurrence of a certain event (e.g., upon the sale or delisting of the item). However, stored messages and other data may be archived in a database associated with the central computer for later retrieval (e.g., if a dispute must be resolved, as described further herein).

In one or more embodiments, a central computer may subdivide voicemail or email mailboxes into categories such as "inquiries", "offers", etc.

Alternatively or additionally, a central computer may sort messages within a given voicemail or email mailbox based on one or more criteria, including but not limited to: (1) the price of an offer (e.g., higher value offers may be given priority in a mailbox), (2) the credibility or rating of a prospective buyer (e.g., more credible, established buyers with stronger ratings may be given priority in a mailbox), (3) the geographical proximity of a remote prospective buyer (e.g., closer buyers may be given priority in a mailbox), and/or (4) historic dealings between the buyer and the seller (e.g., buyers with whom the seller has previously transacted may be given priority over unknown, or lesser known, buyers).

In one or more embodiments, the central computer could facilitate synchronous dialog between counterparties. For example, the central computer may facilitate remote, pre-purchase communication between the buyer and seller. In one or more embodiments, buyers who wish to speak with sellers may initiate a verbal, telephonic dialog. For example, a buyer may, when viewing a particular item on a screen of a cell phone, press a button (e.g., a seller "hotkey") that initiates a phone call to the seller. The central system may route or otherwise facilitate the transmission of the call to the seller, who may answer the phone call in an ordinary manner. It will be readily understood in light of the present disclosure that the verbal dialog enabled by some described embodiments permits more efficient shopping and more fluid, dynamic negotiation than is possible through prior art, Web-based systems for facilitating the sale of items between consumers. Given this ability, sellers can dynamically suggest additional items and create customized packages of items (e.g., "If you buy the saw, I'll throw in the hand drill for another $1 or the drill bit set for just two bucks."

In one or more embodiments, sellers may provide a central computer with rules governing the times and/or circumstances under which the seller should be notified of a purchase inquiry from a prospective buyer. Such customization may ensue at a "posting" step, as described herein. For example, in one or more embodiments, a seller may provide a central computer with a rule which provides that the seller is only to have an ongoing telephone call interrupted when a buyer offers more than a certain price for a posted item, offers to pay through a certain payment medium (e.g., PayPal; network-based billing as described herein), or if any other conditions are satisfied.

Alternatively or additionally, a seller may provide a central computer with a rule which provides that certain calls are or are not to be interrupted (e.g., with call notification data. For example, a seller may register (with the central computer) a rule which provides that phone calls to certain numbers should not be interrupted under any circumstances.

In one or more embodiments, sellers may provide a central computer with rules governing the manner by which the seller should be notified of a purchase inquiry from a prospective buyer. Such customization may ensue at a "posting" step, as described herein.

Thus, in one or more embodiments, sellers may register rules such that they are provided with certain call notification data (e.g., a particular ring tone) to indicate that a call is from a potential buyer (as compared to normal business or personal phone calls). In one or more embodiments, call notification data may include information regarding the buyer and/or any associated offer. For example, in one embodiment, a seller's cell phone may emit a "ring tone" which audibly announces the amount of an offer (e.g., "Offer of $50 for tennis racket"). In such an embodiment, the central computer and/or seller's cell phone may operate text-to-speech conversion software to convert one or more textual attributes of a product listing.

Further, in one or more embodiments, a seller may provide a central computer with a rule which provides that a ring tone should be output through a speaker of a cellular phone at different volumes based on the amount of a prospective buyer's offer (e.g., whether the offer surpasses a reserve amount; whether the buyer has selected a "buy it now" option), the rating of a prospective buyer, and/or any other data point.

In one or more embodiments, buyers who wish to view posted items in real time or substantially real time may request or otherwise initiate a streaming-video transmission of the item. For example, in one or more embodiments, a buyer may, when viewing a particular item on a screen of a cell phone, press a button (e.g., a seller "hotkey") that initiates a request for streaming video from a remote seller. The central computer may transmit the request to the relevant seller. Upon receiving the request, the seller may manipulate a camera phone so that the subject item is within the field-of-vision of the camera phone's lens, and may also press a button to initiate the transmission of video to the prospective buyer's cell phone.

It should be noted that, in embodiments featuring high bandwidth (e.g., 3G) networks, streaming video may be accompanied by voice transmission. Thus, in one embodiment, a seller can use her camera phone to provide a buyer with real-time streaming video of an item, while taking directions from the buyer over a built-in speakerphone to change position, zoom in on a particular part of an object, demonstrate usage of the item, etc. It should be noted that such an embodiment is advantageous in that it permits buyers to "virtually" inspect an item without traveling.

In one or more embodiments, buyers and/or sellers may also elect to have a third party, such as a human assistant (as described herein), participate in a synchronous conversation (e.g., in order to have an "expert" provide advice and guidance). For example, in one embodiment, a buyer presses a button on a cell phone to have a live human assistant participate in a phone call between the buyer and the seller. During the ensuing three-way phone call, the buyer and/or the seller may ask the independent human assistant, who may be trained in the relevant product category, for advice on pricing and other characteristics of the item (e.g., common problems to watch out for, normal wear patterns, etc.). Thus, in one or more embodiments, a buyer can obtain real-time or substantially real-time assistance from category-specific independent contractors who can view camera phone images of items and help the buyer ask appropriate questions of the seller.

Thus, the synchronous dialog capabilities of one or more embodiments described above allows buyers to learn about a used item and its seller before spending a lot of time, traveling, or facing the anxiety of meeting a stranger.

In one or more embodiments, third parties (e.g., human assistants as described herein) may host or otherwise facilitate real-time, verbal auctions (e.g., for an item posted in accordance with a posting step, as described herein) between two or more prospective buyers ("bidders"). Thus, in one or more embodiments, a human assistant may serve as an auctioneer. In one or more embodiments, bidders may orally announce their bids. Alternatively or additionally, bidders may submit bids by pressing buttons on cellular telephones.

In one or more embodiments, bids may be recorded by a central computer. Bidding data may be recorded in a database associated with the central computer. In one or more embodiments, bidding data (e.g., verbal bids) may be recorded and cryptographically stored in a manner identical or similar to that which is described in Applicant's U.S. Pat. No. 6,529,602 B1 entitled METHOD AND APPARATUS FOR THE SECURE STORAGE OF AUDIO SIGNALS, issued Mar. 4, 2003; and Applicant's U.S. patent application Ser. No. 11/183,359 entitled METHOD AND APPARATUS FOR THE SECURE STORAGE OF AUDIO SIGNALS filed Jul. 18, 2005 and issued as U.S. Pat. No. 7,519,836 on Apr. 14, 2009; the entirety of which is incorporated herein for all purposes.

In one or more embodiments, buyers may be charged for phone time with sellers at different rates as compared to normal phone conversations. In one or more embodiments, buyer may be charged for phone time with sellers at higher rates as compared to normal phone conversations. In one or more embodiments, rates for phone time with sellers may be set to a level that encourages commerce but discourages buyers lacking bona fide interest from call sellers and potentially wasting sellers' time.

In one or more embodiments, buyers may be charged a surcharge or flat fee (e.g., $1.00/call) for each call to a seller. Such an embodiment would function to naturally screen buyers having bona fide interest in an item from those who lack bona fide interest. In one or more embodiments, such rates may be set according to customized schedules and rules. For example, higher rates may be applied once a reserve price set for by the seller has been met (i.e., once the seller is going to realize a certain amount of money, all other inquiries may be viewed by a seller as less important, and should be "taxed" accordingly).

In one or more embodiments, a buyer may be credited for any related charges (e.g., phone time, flat fees) if conversation(s) with a seller results in a transaction. In one or more embodiments, charges and credits may be levied against and credited to previously established accounts, such as telephone accounts (e.g., cellular service accounts), ISP accounts, bank accounts or the like.

Some embodiments may provide various security features and benefits. One or more embodiments allow for anonymous and semi-anonymous communications. In one or more embodiments, dialog facilitated by the central computer (e.g., asynchronous or synchronous dialog, as described herein) permits buyers and sellers to discuss a potential transaction without necessarily revealing either party's identity or personal information (such as names, phone numbers, email addresses, postal addresses, etc.). In one or more embodiments, a central controller may determine (e.g., generate, assign, receive) a pseudonym, "screen name", alias, or the like for buyers and/or sellers. When transacting and communicating through the central system, the central system may provide only the buyers' and/or sellers' pseudonyms to sellers and/or buyers, respectively. In one or more embodiments, when a seller posts an item for sale (e.g., as described with reference to the "posting" phase as described herein), the central computer may not post the seller's identity in conjunction therewith. Rather, the central computer may provide a pseudonym of the seller in conjunction with the posted item. Alternatively, the central computer may provide no identifying information of the seller whatsoever, but may still provide buyers with the ability to transmit asynchronous messages to the seller (e.g., email or voicemail) or engage in synchronous dialog with the seller (e.g., a telephone conversation), in which case it would be left to the seller to decide when and if to reveal the seller's identity to prospective buyers.

Alternatively or additionally, a central computer system may conceal identifying information of a buyer when a buyer transmits a message to a seller (e.g., an asynchronous message such as email or voicemail) or initiates a synchronous communication session, so that the seller cannot readily determine the identity of the interested buyer. Further, in an asynchronous messaging embodiment, the central computer may permit the seller to "reply" or respond to a buyer's message in a manner that continues to conceal the identity of the seller and/or conceals the identity of the buyer. Thus, in a manner of speaking, the central computer may act as an "anonymous remailer" or "identity shield." Such functionality permits both parties to see and talk about items over the phone, before deciding whether to meet face-to-face for a final inspection prior to completing a transaction. The system protects the counterparties' identities each party is comfortable exchanging personal information (e.g., phone numbers or addresses). In one or more embodiments, the central computer may provide, and the parties may utilize, a gradual process for revealing identities such as that which is described with reference to Applicant's U.S. Pat. No. 5,884,272 entitled METHOD AND SYSTEM FOR ESTABLISHING AND MAINTAINING USER-CONTROLLED ANONYMOUS COMMUNICATIONS, issued Mar. 16, 1999.

In one or more embodiments, the central computer tracks each party's prior uses of the system (e.g., consummated transactions, complaints received, etc.) and publishes associated ratings for users that future potential counterparties may review and evaluate pursuant to "discovery". In one or more embodiments, prior uses may be reflected in a score or rating that is determined in whole or part by a central computer. The score or rating may be calculated based on one or more metrics that consider one or more of: (1) the number of transactions consummated by a party, (2) the ratio of consummated transactions to postings listed by a party, (3) feedback or scores provided by other users, (4) feedback or scores provided by adjudicators (e.g., as described herein), (5) feedback or scores provided by human assistants (e.g., as described herein), and/or (5) any other metric or data point.

In one or more embodiments, pursuant to a "follow up" step as described further herein, the central computer may receive, from a buyer and/or seller, a message (e.g., a feedback message) pertaining to a previously consummated transaction so that the message may be subsequently reviewed by other parties during a "discovery" step. Such messages may contain pictorial, textual and/or verbal data. For example, a prospective buyer may review audio (e.g., voicemail) messages left by previous buyers who have transacted with a particular seller. This ability to audibly hear prior user experiences may allow the buyer to judge the sincerity and conviction with which each prior buyer describes his or her experience. The ability to audibly hear the psychosocial nuances and queues of a particular prior buyer's feedback illustrates one advantage of the present invention over prior art systems for receiving and publishing textual feedback about prior person-to-person transactions over an electronic network.

In another example, a prospective buyer may review pictures submitted by prior buyers. Such pictures may be of items previously sold by a particular seller. The prospective buyer may then evaluate how items sold by a particular seller typically appear after they are shipped to or otherwise received by buyers. Further, in some embodiments, a prospective buyer may also review pictures of items as originally posted by the seller. The prospective buyer may then determine whether or not the goods were shipped to prior buyers as advertised or promised by the seller, and based on the determination, the prospective buyer may form an opinion as to the trustworthiness of the particular seller.

Some embodiments allow for real-time references. In one or more embodiments, a prospective buyer may select an option (e.g., from an IVR menu; from an HTML page) to speak to a person who has previously transacted with a particular seller. Conversely, a seller may select an option to speak with a person who has previously transacted with a particular buyer. The central computer may receive such a selection and may facilitate a synchronous communication session between the parties. In this manner, prospective buyers and sellers may question individuals about potential counterparties' prior transactional conduct. Such prospective buyers and sellers may be charged (e.g., through a charge to a phone bill) for such communications, and individuals who are called to provide historic information may be compensated (e.g., through a credit to a phone bill).

In one or more embodiments, a central computer may facilitate a face-to-face meeting between a buyer and a seller. For example, a buyer may utilize the central computer to arrange for an inspection of an item a seller has posted for sale through the central computer. In one or more embodiments, a central computer may provide a buyer and/or seller with driving directions to a seller and/or buyer's location (e.g., residence). In one or more embodiments, a central computer may determine driving directions by (1) determining a geographical position of a first party (e.g., a prospective buyer or seller), (2) determining a geographical position of a second party (e.g., a prospective buyer or seller), (3) retrieving geographical data (e.g., maps) from a database (e.g., such as a database maintained by a remote third party website, such as Mapquest.com), and/or (4) providing the geographical data to one or both of the first and/or second party (e.g., transmitting a map to a prospective buyer's cell phone). In one or more embodiments, the central computer may determine a geographical position of a first and/or second party by (1) determining a GPS coordinate of a device (e.g., a buyer's cell phone, a seller's cell phone); (2) determining position of a device relative to one or more cellular network communications towers (e.g., through cell phone "triangulation" methods), (3) retrieving information from a database (e.g., retrieving a seller's address from a database).

In one or more embodiments, during a face-to-face meeting between a prospective buyer and a seller, the prospective buyer and/or seller may utilize a device (e.g., a cellular telephone) to request or otherwise initiate (e.g., through the central computer) a synchronous communication session with a human assistant (as described herein), who may provide information or advice. For example, a buyer may contact a human assistant through a cellular phone by first transmitting a request to speak with a human assistant to the central computer. The central computer may the enable a synchronous communication link between the buyer's cell phone and a human assistant's device. The buyer may then use the cellular phone to transmit pictures and/or video of a particular item to the human assistant. The buyer may alternatively or additionally speak with the human assistant telephonically. The human assistant may, in turn, provide the buyer with (a) relevant questions to ask the seller (e.g., "has this bicycle ever been in an accident?"), (b) pricing information (e.g., "1987 Schwinn Fastbacks of similar condition typically sell for around $125"), and/or (c) any other information or advice.

In one or more embodiments, a central computer (and/or an entity associated therewith) may facilitate the consummation of a sale, as described herein. For example, after a buyer identifies a posted item of potential interest pursuant to one or more shopping or browsing steps discussed herein, and the buyer and/or seller complete one or more discovery steps as discussed herein, the central controller may facilitate an exchange of payment from the buyer for the item(s) listed by the seller.

As discussed above, the central computer may facilitate a face-to-face meeting of the buyer and the seller. As such, a face-to-face transaction may be arranged where the buyer pays the seller in-person, and takes possession of the item(s) substantially instantaneously. As compared with prior art electronic networks for person-to-person sales of goods, the ability to consummate face-to-face transactions enabled by the present invention is advantageous in that it (1) eliminates shipping costs, (2) eliminates the potential for damages due to shipping, (3) eliminates the burdens associated with returning shipped goods, permits sellers to accept cash, eliminating both risk associated with accepting non-cash payments and the time required to receive non-cash payments (e.g., the several days it takes for a check to clear), and (4) ensures simultaneity of exchange (e.g., ensures that that the seller will receive payment when he relinquishes possession of items; ensures that the buyer will receive the goods when he relinquishes payment).

In one or more embodiments, a buyer may arrange to pay a seller in one or more ways, as described herein. As discussed, in one or more embodiments, a buyer may pay a seller in cash. Further, in one or more embodiments, a buyer may provide to the central computer a financial account identifier (e.g., checking account number, credit or debit card number) or electronic currency identifier, so that the central computer can process payment in accordance with the provided identifier, as would be apparent to one of ordinary skill in the art. Further, in one or more embodiments, a buyer and seller may agree to swap or trade items. Further still, in one or more embodiments, the central computer may allow a buyer to charge the cost of the transaction (e.g., the cost of the item and/or any applicable fees as described herein) to an established service account, such as they buyer's cellular telephone account. For example, a buyer may utilize a user interface of his cellular telephone to (a) select an item posted by a seller, and (b) select an option to purchase the item that initiates a charge against the buyer's account in an amount greater or equal to the purchase price of the item. The central computer may receive such selections and debit the buyer's account by the appropriate amount.

For such a payment option, the central computer and/or operator thereof may charge the buyer and/or seller a flat fee and/or a percentage of the purchase price. A buyer and/or seller may instruct the central computer to provide payment to the seller in one or more ways. In accordance with such instructions, in one or more embodiments, the central computer and/or operator thereof may (a) issue a check to the seller, (b) credit a financial account associated with the seller (e.g., a credit or debit card account, a checking account, a PayPal account), and/or (c) credit a service account associated with the seller (e.g., the seller's cellular service account). In one or more embodiments, a seller may be credited in an alternate form of currency (e.g., trade credits acceptable only by the central computer and/or the operator thereof).

In one or more embodiments, the central computer may facilitate the consummation of a transaction by assisting the parties in the formation of a legally enforceable agreement or contract. For example, in one or more embodiments, an IVR-based application may provide one or more "boilerplate" (i.e., standard) contract terms from which the parties may select and/or accept (e.g., through DTMF tone transmission; verbally). Exemplary types of standard terms and provisions may address or provide for method of payment, method of delivery, dispute resolution methods and terms (including having disputes resolved by the central computer, an operator thereof, or a third party, as described further herein).

In one or more embodiments, the central computer may record any or all aspects of the formation or performance of a contract by the parties. Such recordings may provide material evidence for any ensuing disputes. In one or more embodiments, the central computer may record the parties' verbal representations, warranties, offers and/or acceptances. For example, a seller's 30-day money back guarantee, or an assertion that an item is sold "as is" with no warranty, can be recorded and stored for future reference. Such recordings can be stored in accordance with cryptographic protocols discussed at length in Applicant's U.S. Pat. No. 6,529,602 B1 entitled METHOD AND APPARATUS FOR THE SECURE STORAGE OF AUDIO SIGNALS, issued Mar. 4, 2003; and Applicant's U.S. patent application Ser. No. 11/183,359 entitled METHOD AND APPARATUS FOR THE SECURE STORAGE OF AUDIO SIGNALS; filed Jul. 18, 2005 and issued as U.S. Pat. No. 7,519,836 on Apr. 14, 2009; the entirety of which is incorporated herein for all purposes.

Also, in one or more embodiments, the fact of delivery and the condition of delivered goods can be recorded by the buyer through the buyer's camera phone and transmitted to the central computer for storage.

In one or more embodiments, the central computer (and/or an entity associated therewith) performs and/or otherwise facilitates one or more of the following types of functions. In one or more embodiments, after an item is sold, a seller may instruct the central computer to "de-list" the item so that it is not advertised or searchable by other buyers. In one or more embodiments, a central computer or operator thereof may require the seller to so de-list an item. Optionally, sellers can be encouraged to de-list items by threat of financial penalty (e.g., a seller's account may be charged a penalty if an item is not de-listed within X days of a reported sale).

In one or more embodiments, a buyer may (e.g., with a camera phone) capture a picture of the shipped product and transmit the picture to the seller and/or the central system. In one or more embodiments, a central computer or operator thereof may require the buyer to transmit such a picture (e.g., before the central controller will provide payment to a seller). Optionally, buyers can be encouraged to provide pictures of shipped items by threat of financial penalty (e.g., a buyer's account may be charged a penalty if a picture of a shipped item is not provided to the central computer within X days of a seller reporting shipment).

In one or more embodiments, an aggrieved party may transmit a complaint to a central computer, an operator thereof and/or a third party (e.g., a human assistant). Thus, in one embodiment, a central controller receives a complaint from an aggrieved party. According to various embodiments, a complaint may (1) be treated in a conventional manner (e.g., investigated by a customer service representative), (2) impact a rating of a counterparty, and/or (3) initiate a dispute resolution process, described herein.

In one or more embodiments, a central computer, an operator thereof and/or a third party (e.g., a human assistant) may assist in the resolution of disputes between buyers and sellers. In one or more embodiments, central computer, an operator thereof and/or a third party (e.g., a human assistant) may adjudicate disputes pursuant to agreed-upon procedural rules. Parties and/or adjudicators may have access to evidence recorded as discussed herein (e.g., textual, pictorial and/or audio evidence including but not limited to contractual terms, verbal representations and warranties, evidence of the parties' performance or lack thereof, etc.).

In one or more embodiments, a central computer, an operator thereof and/or a third party (e.g., a human assistant serving in an adjudicatory capacity) may institute one or more forms of recourse against an actual or alleged wrongdoer and/or in favor of an aggrieved party.

In one or more embodiments, the central computer and/or an operator associated therewith (e.g., a cellular service provider) may, in essence, claim and act upon a "priority lien" against sale proceeds, so that phone charges are satisfied before a seller may realize sale proceeds. Thus, if a seller is delinquent in paying for phone service, a cellular service provider may utilize sale proceeds to satisfy, in whole or part, outstanding debts before the seller receives any such sale proceeds.

In one or more embodiments, the central computer and/or an operator associated therewith (e.g., a cellular service provider) may, in whole or part, de-active or otherwise limit the functionality of a wrongdoer's cellular telephone or cellular account. For example, a wrongdoer's cellular phone service may be disabled temporarily (e.g., until debts are paid; until an adjudication process is complete) or permanently. Alternatively or additionally, the central computer and/or an operator associated therewith (e.g., a cellular service provider) may de-list items that a party has posted for sale, may prevent the purchase of an item, may charge additional fees for services (e.g., higher payment processing fees; higher per minute phone usage fees), or may alter a party's ability to utilize services in any other manner.

Additional Embodiments

Some embodiments allow for or facilitate combinatorial selling or "virtual" partnerships. In one or more embodiments, a central computer may allow a first seller and a second seller to "link" to one another (e.g., through a visual user interface), so that (1) one seller may answer an inquiry (e.g., a phone call) directed to another seller, (2) sellers may share proceeds according to an agreement (e.g., equal rights to proceeds), etc. In this manner, sellers with items that may supplement or complement each other may create "virtual stores" showcasing the combined inventory. Such combined inventory may be aggregated in one posting and/or in several "linked" postings, so that prospective buyers may readily browse the related items. Moreover, sellers knowledgeable in a particular area may be recruited by a seller to answer sales inquires should the recruiting seller be unavailable (e.g., during work hours).

Some embodiments allow for combinatorial shopping. In one or more embodiments, buyers may effectively shop in groups by notifying each other of postings, by viewing the same postings (e.g., simultaneously or substantially simultaneously), and/or by conversing with one another verbally while viewing the same postings.

Some embodiments allow for shopping tour guides and/or for allowing a user to receive information about a shopping experience of another user. For example, in one or more embodiments, one or more users may view the items that a given prospective shopper is viewing, either simultaneously, substantially simultaneously, or otherwise. Thus, a celebrity may shop for items on the network, and fans may watch the celebrity's shopping experience.

In one or more embodiments, a prospective buyer may submit an offer to the central controller, conditioned on the ability to purchase for a single price two or more products posted by two or more prospective sellers. The central computer or an operator or agent thereof may negotiate with the two or more individual sellers in an effort to obtain commitments to sell the underlying products for a total sum less than or equal to the buyer's offer price for the package or combination of items.

In one or more embodiments, sellers may obtain pricing guidance from a human assistant via the central computer, as described herein. Thus, sellers who are preparing for a yard sale or garage sale may utilize a human assistant to provide pricing guidance for a plurality of items in a single communications session. During the communications session, the human assistant may have access to a secondary market database that stores pricing information for items within the seller's relevant geographic area. Following the communications session, the human assistant may provide (e.g., via email or postal mail) a data file that contains text that may be printed onto price tags or price sheets, so that the seller may readily label the items with the suggested prices.

Some embodiments facilitate price discrimination among subscribers and non-subscribers of a particular telephone service. In one or more embodiments where a cellular service provider operates the central computer, the central computer may be programmed to charge customers of competing cellular carriers additional fees or higher prices for the services described herein. Indeed, in one or more embodiments, the central computer may be programmed to prevent customers of competing cellular carriers from using services facilitated by the central computer.

Some embodiments facilitate use of one or more online auction posting systems. In some embodiments, a cell phone can be directly or indirectly interfaced with an online auction system (e.g., the eBay system). In other words, embodiments are directed to using a device (e.g., a camera phone) to post data to an auction system. As described herein, a device such as a cellular telephone may be employed to capture and/or generate data to be posted, such as images (e.g., photos of the item to be sold), video, text (e.g., a textual description of the item to be sold, terms of sale, seller information) which may be entered via a keypad of the device or converted from audio input (e.g., a verbal description of the item to be sold) as described herein.

The data to be posted may be posted directly to the auction site. For example, the data to be posted may be transmitted to a server (e.g., a web server) that operates the auction site or cooperates with a server for the auction site. The transmitted data may be formatted in a manner amenable to interpretation and/or processing. For example, the data may be formatted to include "tags", such as XML tags in accordance with a predetermined DTD. As is known, tags can serve to identify the type and/or meaning of data. Tags may be used to indicate, e.g., photos of the item, the description of the item, information regarding the seller, a minimum bid price, shipping terms, and other information which the auction site may require or allow to be submitted by a seller. In another embodiment, the type and/or meaning of data may be inferred from the order it is transmitted (e.g., photos are transmitted first, then a textual description).

The data to be posted may be posted indirectly to the auction site. For example, the data to be posted may be transmitted, directly or indirectly, to a processing device, such as a server or other device operable to process the data and render the data into a format which is suitable for receipt by the auction site. For example, in an embodiment where the auction site receives data from sellers via web pages (e.g., one or more HTML forms), the processing device can receive the data to post (e.g., via a wireless telephone transmission, via the Internet) and arrange the received data in a known manner into one or more HTML POST commands to send an appropriate input stream (e.g., an input stream defined by the HTML form).

Whether the data to be posted is posted directly or indirectly, the entirety of the data may be transmitted as substantially a single transmission (e.g., in about the shortest time possible given the applicable transmission rate). Alternatively, the data may be transmitted as a plurality of transmissions that are separated in time (e.g., by second, by minutes, by hours).

The user device (e.g., a cell phone, a personal computer) may perform some or all of the functions of the processing device. Additionally or alternatively, another device (e.g., a computer accessible via the wireless network of a cellular telephone) may perform some or all of the functions of the processing device. An internet-enabled user device (e.g., an Internet-enabled cell phone) could transmit data over the Internet, such as over the Internet to the preprocessor or to a server of the auction site (e.g., one or more web servers). A user device (e.g., cell phone) which is not internet-enabled could transmit data via (1) placing a call to a predetermined telephone number (e.g., a "900" number for which a charge is applied), and (2) transmitting analog audio data (e.g., a sequence DTMF tones) to that telephone number using a predetermined protocol (e.g., certain sequences of tones correspond to certain numbers or other values of data). A device (e.g., a computer operable to receive the audio data transmitted to the telephone number) receives the analog audio data and interprets the received audio data according to the protocol, thereby yielding the data transmitted by the user device.

In embodiments where a central computer is operated and maintained by a cellular service provider, such a cellular service provider may enjoy many benefits. Such a provider has an installed base of cell phone users. Cellular service providers may market services enabled by the present invention to their existing customers. Also, cellular service providers practicing one or more embodiments of the present invention may offer customers many ongoing reasons to continue as customers. Sellers are less likely to switch phone service providers if they have items up for sale on the network, have established buyer/seller ratings, etc. Thus, the present invention provides cell phone providers with a way to regain the "stickiness" they lost with the number portability legislation, but tried to retain through penalty-backed service agreements.

Also, a practicing cellular service provider may leverage its existing billing infrastructure, which may readily facilitate micro-payments and small-value transactions. The ability of some of the described embodiments to permit a rich, multimedia pre-purchase "discovery" experience would likely reduce the possibility of a dispute between counterparties, making such a system easier to administrate than prior art electronic networks for the sale of used items between consumers.

A cellular provider offering services enabled by the present invention may grow revenues from existing telephone services through the ensuing phone usage. For example, as buyers and sellers talk during a pre-purchase "negotiation" step as described herein, cellular providers may earn revenues from conversations that otherwise may not have been initiated. Indeed, in some embodiments, even if customers circumvent the central computer during a consummation phase, the cellular provider may still earn revenue from phone conversations between parties. Moreover, cellular providers may grow revenues received through the additional data transfer and data storage encouraged by the present invention.

What we claim is:

1. An apparatus comprising:
   a processor;
   a communications device in communication with the processor, the communications device being operable to communicate with a plurality of mobile devices over a voice data network; and
   a storage device in communication with the processor, the storage device storing instructions configured to direct the processor to perform a method comprising:
      receiving, from a mobile device over the voice data network, a digital image of an item for sale taken by a seller of the item using the mobile device;
      receiving, from the mobile device, a description of the item in an audio format;
      converting the description into a non-audio indication of the description; and
      providing the digital image of the item for sale with the indication of the description to at least one potential buyer.

2. A mobile device comprising:
   a processor;
   a camera in communication with the processor;
   a microphone in communication with the processor;
   a communications device in communication with the processor, the communications device being operable to communicate with a central computer over a data network; and
   a storage device in communication with the processor, the storage device storing instructions configured to direct the processor to perform a method comprising:
      directing the camera to capture a digital image of an item for sale by a seller;
      receiving from the seller via the microphone a verbal description of the item;
      converting the verbal description into a non-verbal indication of the verbal description; and
      providing the digital image of the item for sale with the indication of the verbal description to at least one potential buyer via the central computer.

3. The mobile device of claim 2, further comprising:
   a button operable to initiate a signal to the processor,
   and in which the method further comprises at least one of the following steps:
      in response to receiving by the processor the signal initiated by the button, prompting the seller to provide information about the item for sale; and
      in response to receiving by the processor the signal initiated by the button, transmitting the digital image to the central computer.

4. A system comprising:
   a mobile device comprising a digital camera and a telephone, the mobile device being configured to provide digital images of items for sale taken by a seller using the mobile device and voice data over a network to a central server;

a user device in communication with the central server and configured to receive information about items for sale; and the central server configured to receive from the mobile device a digital image taken by a seller of an item for sale, receive voice data from the mobile device including a description of the item for sale, convert the description into a non-voice indication of the description, and transmit the digital image of the item for sale with the indication of the description to the user device.

5. A method comprising:
receiving, by a central server in communication with a plurality of mobile devices, via a mobile telephone a digital image taken by the seller of an item for sale by the seller;
receiving by the central server from the mobile telephone a description of the item in an audio format;
converting by the central server the description into a non-audio indication of the description; and
providing via the central server the digital image of the item for sale with the indication of the description to at least one potential buyer.

6. The method of claim 5, in which the mobile telephone comprises a digital camera.

7. The method of claim 5, in which the mobile telephone comprises a video camera.

8. The method of claim 5, in which the mobile telephone is a camera phone.

9. The method of claim 5, in which the digital image comprises a digital picture.

10. The method of claim 5, in which the digital image comprises a video file.

11. The method of claim 5, in which receiving the audio description comprises:
receiving the audio description via a microphone.

12. The method of claim 5, in which receiving the audio description comprises:
receiving the audio description from a personal computer.

13. The method of claim 5, further comprising:
storing an indication of the audio description.

14. The method of claim 13, in which storing comprises:
storing an indication of the audio description cryptographically.

15. The method of claim 5, further comprising:
storing the audio description in association with the digital image.

16. The method of claim 5, further comprising:
converting the audio description to a text description.

17. The method of claim 16, in which converting comprises:
converting the audio description to a text description using conversion software.

18. The method of claim 16, in which converting comprises:
transmitting the audio description to a human assistant; and
receiving a text description determined by the human assistant.

19. The method of claim 5, further comprising:
transmitting an indication of the item for sale to a human assistant.

20. The method of claim 19, further comprising:
receiving from the human assistant an indication of a category of the item.

21. The method of claim 5, further comprising:
determining a category of the item.

22. The method of claim 21, further comprising:
selecting at least one human assistant based on the determined category.

23. The method of claim 5, further comprising:
enabling communication between the seller and at least one human assistant.

24. The method of claim 5, further comprising:
transmitting a suggested price for the item to the seller.

25. The method of claim 5, further comprising:
prompting the seller to provide information about at least one characteristic of the item.

26. The method of claim 5, further comprising:
requesting the seller to provide an additional digital image of the item.

27. The method of claim 26, further comprising:
determining the received digital image does not meet a minimum threshold of quality.

28. The method of claim 5, further comprising:
receiving a second digital image of the item; and
selecting one of the received digital images for posting the item.

29. The method of claim 5, further comprising:
initiating capture of the digital image via the mobile telephone.

30. The method of claim 5, further comprising:
receiving from the seller at least one criterion for accepting calls from prospective buyers.

31. A method comprising:
receiving via a first mobile telephone a digital image taken by a seller of an item for sale by the seller;
receiving from the first mobile telephone a description of the item in an audio format;
converting the description into a non-audio indication of the description;
providing the digital image of the item for sale with the indication of the description to a potential buyer via a second mobile telephone; receiving via the second mobile telephone a request by the potential buyer to initiate communication with the seller associated with the item; and
in response to receiving the request, initiating verbal communication between the potential buyer and the seller over a mobile telephone network.

32. A non-transitory computer readable medium storing instructions configured to direct a processor to perform:
receiving via a first mobile telephone a digital image taken by a seller of an item for sale by the seller;
receiving from the first mobile telephone a description of the item in an audio format;
converting the description into a non-audio indication of the description;
providing the digital image of the item for sale with the indication of the description to a potential buyer via a second mobile telephone;
displaying the item available for sale to a potential buyer via a second mobile telephone;
receiving via the second mobile telephone a request by the potential buyer to initiate communication with the seller associated with the item; and
in response to receiving the request, initiating verbal communication between the potential buyer and the seller over a mobile telephone network.

33. An apparatus comprising:
a processor; and
a computer readable medium in communication with the processor, the computer readable medium storing instructions configured to direct a processor to perform:

receiving via a first mobile telephone a digital image taken by a seller of an item for sale by the seller;

receiving from the first mobile telephone a description of the item in an audio format;

converting the description into a non-audio indication of the description;

providing the digital image of the item for sale with the indication of the description to a potential buyer via a second mobile telephone;

displaying the item available for sale to a potential buyer via a second mobile telephone;

receiving via the second mobile telephone a request by the potential buyer to initiate communication with the seller associated with the item; and in response to receiving the request, initiating verbal communication between the potential buyer and the seller over a mobile telephone network.

* * * * *